(12) United States Patent
Oba (10) Patent No.: US 10,368,009 B2
(45) Date of Patent: Jul. 30, 2019

(54) IMAGING APPARATUS (71) Applicant: SONY CORPORATION, Tokyo (JP)

(72) Inventor: Eiji Oba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/902,696

(22) PCT Filed: Jul. 11, 2014

(86) PCT No.: PCT/JP2014/068542
§ 371 (c)(1),
(2) Date: Jan. 4, 2016

(87) PCT Pub. No.: WO2015/012120
PCT Pub. Date: Jan. 29, 2015

(65) Prior Publication Data
US 2016/0173748 A1    Jun. 16, 2016

(30) Foreign Application Priority Data
Jul. 23, 2013 (JP) ................................ 2013-152897

(51) Int. Cl.
*H04N 5/238* (2006.01)
*H04N 5/217* (2011.01)
(Continued)

(52) U.S. Cl.
CPC ............... *H04N 5/238* (2013.01); *B60R 1/00* (2013.01); *B60R 11/04* (2013.01); *G03B 11/00* (2013.01);
(Continued)

(58) Field of Classification Search
CPC ...... H04N 5/238; H04N 5/217; H04N 5/2254; B60R 1/00; B60R 2300/8066
(Continued)

(56) References Cited

U.S. PATENT DOCUMENTS

| 5,543,612 A | 8/1996 | Kanaya et al. |
| 2009/0207508 A1* | 8/2009 | Shinohara ............... G02B 9/34 359/779 |
| 2015/0291216 A1* | 10/2015 | Sato ..................... B60W 50/14 701/23 |

FOREIGN PATENT DOCUMENTS

| JP | 08-145619 | 6/1996 |
| JP | 11-041521 A | 2/1999 |

(Continued)

OTHER PUBLICATIONS

Extended European Search Report of EP Patent Application No. 14828768.3, dated Jan. 31, 2017, 07 pages.

(Continued)

*Primary Examiner* — Hee-Yong Kim
(74) *Attorney, Agent, or Firm* — Chip Law Group (57) ABSTRACT

The present technology relates to an imaging apparatus capable of offering useful information with higher certainty. An imaging apparatus includes an optical system that condenses light received from a subject, an imaging device that photoelectrically converts the light received from the optical system to form a pickup image, and a cover glass disposed between the optical system and the imaging device to protect a surface of the imaging device. The cover glass is disposed obliquely to the imaging device. When stray light corresponding to light reflected on the imaging device enters the cover glass as a part of light having entered the imaging device via the optical system and the cover glass, this stray light is reflected on the cover glass toward a low harmful area of the imaging device. Accordingly, flares generated by stray light decreases in a recognition useful area. The present technology is applicable to an on-vehicle camera, a ceiling type monitoring camera, or others.

9 Claims, 6 Drawing Sheets

(51) Int. Cl.
  *H04N 5/225* (2006.01)
  *B60R 1/00* (2006.01)
  *B60R 11/04* (2006.01)
  *G03B 11/00* (2006.01)
  *G03B 17/02* (2006.01)

(52) U.S. Cl.
  CPC ............. *G03B 17/02* (2013.01); *H04N 5/217* (2013.01); *H04N 5/2254* (2013.01); *B60R 2300/8066* (2013.01)

(58) Field of Classification Search
  USPC ........................................................ 348/148
  See application file for complete search history.

(56) References Cited

FOREIGN PATENT DOCUMENTS

| | | |
|---|---|---|
| JP | 2001-111873 A | 4/2001 |
| JP | 2001-218106 A | 8/2001 |
| JP | 2002-152562 A | 5/2002 |
| JP | 2003-172881 A | 6/2003 |
| JP | 2006-295714 A | 10/2006 |
| JP | 2008-054302 A | 3/2008 |
| JP | 2009-093198 A | 4/2009 |
| JP | 2010-266528 A | 11/2010 |
| JP | 2012-075037 A | 4/2012 |

OTHER PUBLICATIONS

Office Action for CN Patent Application No. 201480040208.4, dated Dec. 27, 2017, 07 pages of Office Action and 11 pages of English Translation.

Office Action for JP Patent Application No. 2015-528225, dated May 29, 2018, 07 pages of Office Action and 04 pages of English Translation.

Office Action for CN Patent Application No. 2015-528225, dated Dec. 18, 2018, 06 pages of Office Action and 4 pages of English Translation.

Office Action for JP Patent Application No. 2015-528225, dated Jun. 4, 2019, 05 pages of Office Action and 03 pages of English Translation.

Office Action for JP Patent Application No. 2015-528225, dated Jun. 4, 2019, 02 pages of Office Action and 04 pages of English Translation.

* cited by examiner

IMAGING APPARATUS

TECHNICAL FIELD

The present technology relates to an imaging apparatus, and more particularly to an imaging apparatus capable of offering useful information with higher certainty.

BACKGROUND ART

There is known a technology providing assistance for a driver in driving a vehicle based on information extracted from an image which has been formed by an imaging apparatus provided on the vehicle, for example.

A specific example of this driving assistance technology for assisting a driver is emission of a warning at the time of deviation of the vehicle of the driver from a lane based on recognition of a white line on a roadway contained in an image. Another example is emission of an alert for collision prevention based on recognition of another vehicle or person present before or behind the vehicle of the driver in an image.

Accordingly, an image around the vehicle formed by the imaging apparatus offers information useful for driving assistance. For realizing extraction of such useful information with more certainty, formation of a clear image containing a subject to notice is essential.

As an example of a technology associated with the imaging apparatus, there has been currently proposed a technology which arranges a cover glass provided on a front surface of an imaging device such that a light entrance surface of the cover glass is located obliquely to the imaging device to reduce interference of light reflected inside the cover glass (for example, see Patent Document 1).

There has been further proposed a technology associated with the imaging apparatus of a type containing a light source for illuminating a subject. According to this technology, a camera cover is obliquely fixed to prevent entrance of light into an imaging surface of the imaging apparatus after the light is emitted from the light source and reflected on the camera cover (for example, see Patent Document 2).

CITATION LIST

Patent Documents

Patent Document 1: Japanese Patent Application Laid-Open No. 08-145619
Patent Document 2: Japanese Patent Application Laid-Open No. 11-2609

SUMMARY OF THE INVENTION

Problems to be Solved by the Invention

However, the technologies noted above are sot effective when a subject contains a high-luminance light source. In this case, useful information is difficult to obtain with higher certainty. For example, when an image of a subject is formed by the imaging device in a state that intense light emitted from the subject is reflected inside the imaging apparatus, secondary reflection light thus produced may generate a flare (stray light) in an image around the high-luminance light source. In this case, visibility of the subject in an important target portion may considerably deteriorate.

An object of the present technology developed in consideration of the aforementioned circumstances is to offer useful information with higher certainty.

Solutions to Problems

A typical imaging device forms an image of a subject on a light receiving surface of the imaging device, and generates a video signal based on the image. When a harmful material which blocks an optical path, such as a contaminant, falls on the surface of the light receiving surface, a faulty image may be produced for the video signal as a result of blocking of the optical path. For preventing this problem, the light receiving surface of the imaging device is covered with an optically transmissible protection member disposed at a position away from an image forming surface to prevent entrance of impurities such as contaminants.

An imaging apparatus according to one aspect of the present technology includes: an image loaning system that condenses light received from a subject; an imaging unit that receives the light condensed by the image forming system and photoelectrically converts the light; and a protection member provided to protect the imaging unit, and disposed between the image forming system and the imaging unit such that an imaging unit side surface of the protection member is disposed obliquely to the imaging unit.

The imaging apparatus may be an on-vehicle camera.

The imaging unit side surface of the protection member may reflect the light reflected on the imaging unit and entering the protection member such that the light travels in a direction away from an area of the imaging unit associated with an area of interest in an image formed by the photoelectric conversion at the imaging unit.

The imaging unit side surface of the protection member may have an oblique angle at which an optical path of the light reflected on the imaging unit and entering from the imaging unit into the protection member and an optical path of the light again reflected on the imaging unit become asymmetric with respect to a normal line of a light receiving surface of the imaging unit when the light reflected on the imaging unit and entering the protection member is again reflected on the imaging unit.

The imaging unit side surface of the protection member may have an oblique angle at which the light reflected on the imaging unit and entering the protection member is again reflected on the imaging unit toward a road surface.

The imaging unit side surface of the protection member may be disposed such that an angle of substantially 45 degrees is formed by the imaging unit side surface of the protection member and the light receiving surface of the imaging unit.

The imaging apparatus may further comprise an absorbing member provided to absorb the light and disposed in a direction where the imaging unit side surface of the protection member faces.

The protection member may function as an optical filter that blocks a predetermined wavelength component of the light having entered the protection member from the subject.

According to the one aspect of the present technology, the imaging apparatus includes the image forming system that condenses light received from a subject, and the imaging unit that receives the light condensed by the image forming system and photoelectrically converts the light. The protection member provided to protect the imaging unit is disposed between the image forming system and the imaging unit such that the imaging unit side surface of the protection member is disposed obliquely to the imaging unit.

Effects of the Invention

According to the one aspect of the present technology, useful information is offered with higher certainty.

MODE FOR CARRYING OUT THE INVENTION

An embodiment according to the present technology is hereinafter described with reference to the drawings.

First Embodiment

<Outline of Present Technology>

The present technology relates to an imaging apparatus mounted on a vehicle, for example, to form an usage containing information to be utilized for driving assistance or other purposes.

Figure 1:
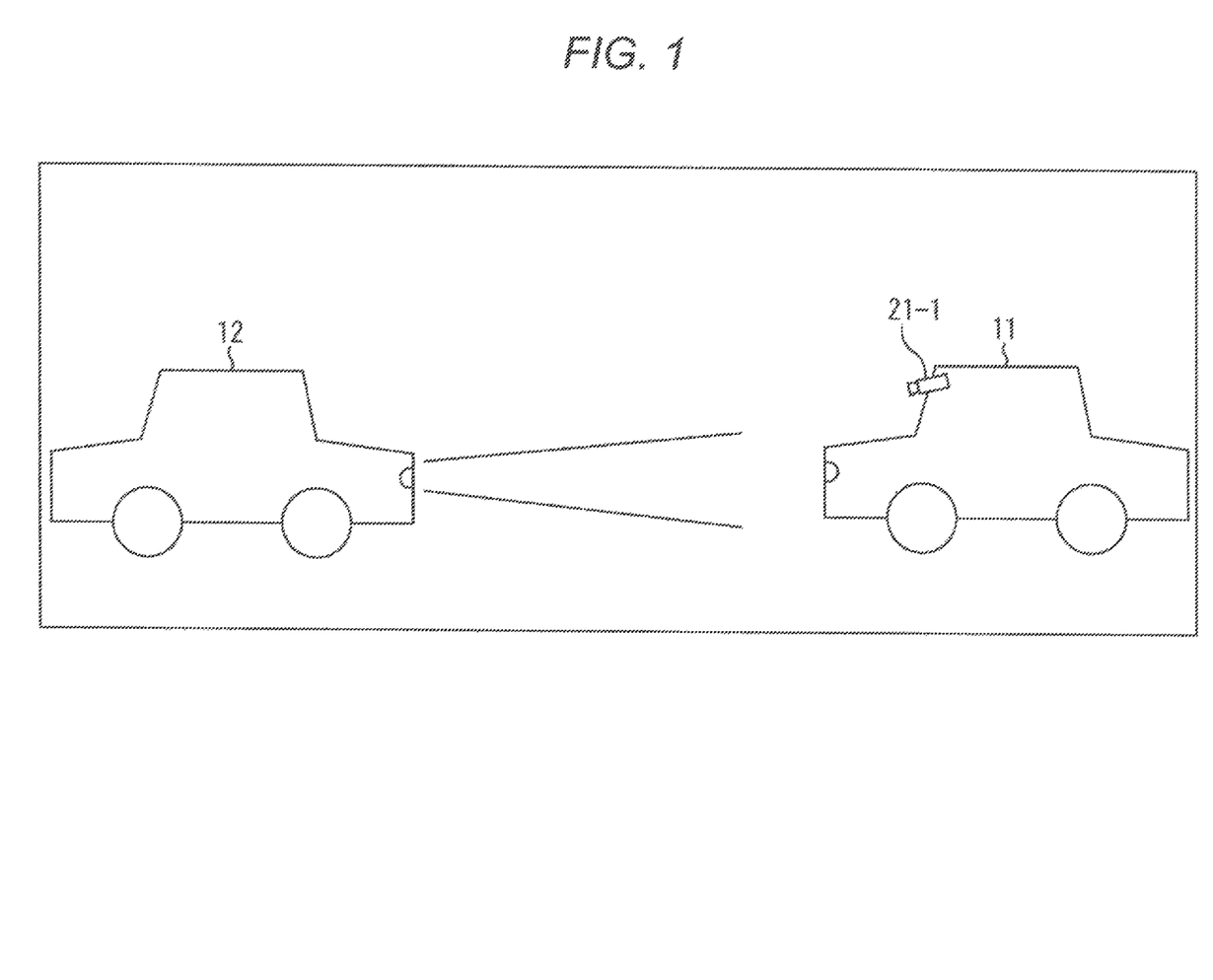
FIG. 1 is a view illustrating an application example of the present technology.

FIG. 1 illustrates an imaging apparatus 21-1 as an application example of the imaging apparatus according to the present technology. The imaging apparatus 21-1, which is an on-vehicle camera or the like, is mounted on the front face of a vehicle 11, which is a passenger car or the like, to image the front of the vehicle 11 as illustrated in FIG. 1. For example, the imaging apparatus 21-1 forms an image of the front of the vehicle 11 for the purpose of driving assistance.

According to this example, the vehicle 11 runs from the right side to the left side in the figure. A vehicle 12 on the opposite lane is approaching the vehicle 11 from the front of the vehicle 11. The situation illustrated in FIG. 1 is an example of a night scene, wherefore the vehicle 12 is running with the headlight of the vehicle 12 turned on. In this situation, the imaging apparatus 21-1 forms an image of the vehicle 12 as one of subjects to be imaged.

Figure 2:
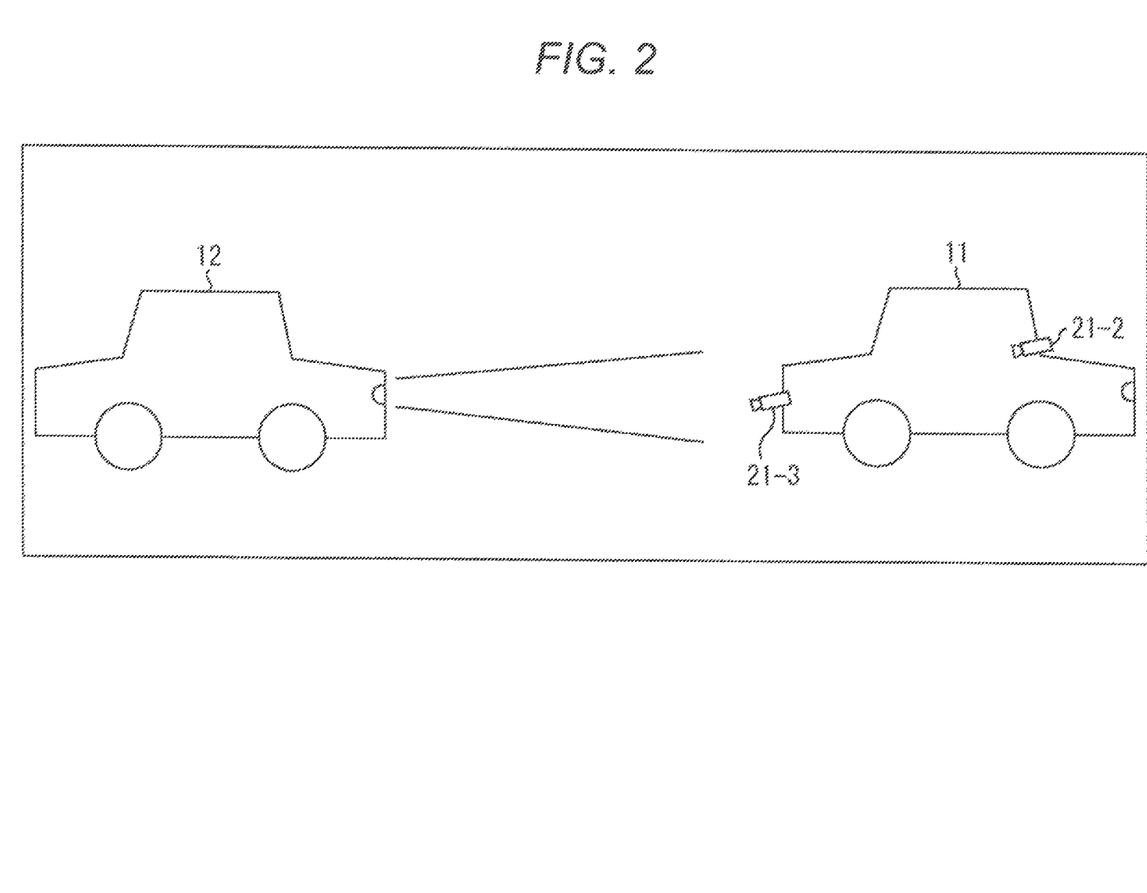
FIG. 2 is a view illustrating an application example of the present technology.

FIG. 2 illustrates another application example of the imaging apparatus according to the present technology. Parts in FIG. 2 similar to the corresponding parts in FIG. 1 have been given similar reference numbers, and the same explanation is not repeated.

According to the example illustrated in FIG. 2, the vehicle 11 runs from the left to the right in the figure. The vehicle 12 positioned on the rear side of the vehicle 11 runs in the same direction as the running direction of the vehicle 11 with the headlight of the vehicle 12 turned on.

In case of this example, an imaging apparatus 21-2, which is an on-vehicle camera or the like, is provided in the vicinity of a side mirror of the vehicle 11, i.e., on the side surface of the vehicle 11 to form an image of the rear of the vehicle 11. In addition, an imaging apparatus 21-3, which is an on-vehicle camera or the like, is provided on a rear region of the vehicle 11, i.e., in the vicinity of a rear bumper of the vehicle 11, for example, to form an image of the rear of the vehicle 11. Similarly to the imaging apparatus 21-1, each of the imaging apparatuses 21-2 and 21-3 forms an image of the vehicle 12 as one of subjects to be imaged.

Each of the imaging apparatuses 21-1 through 21-3 is hereinafter collectively referred to as an imaging apparatus 21 when distinction is not particularly needed between the imaging apparatuses 21-1 through 21-3 for imaging the surroundings of the vehicle 11, particularly an area relatively far from the vehicle 11.

A pickup image formed by the imaging apparatus 21 is utilized for the purpose of driving assistance for a driver driving the vehicle 11, for example. More specifically, a person, the vehicle 12, a white line and others are detected based on the pickup image to emit a collision alert or a warning of deviation from a lane in accordance with a detection result. A sudden lane change or a sudden braking based on determination of the presence of an approaching vehicle from the rear may produce a dangerous situation possibly leading to collision. Accordingly, the use of the imaging apparatuses 21-1 through 21-3 for the purpose of alert and warning assistance is expected.

The imaging apparatus, which is an on-vehicle camera provided to form an image around the vehicle for the purposes illustrated in FIGS. 1 and 2, includes a cover glass for protecting an imaging device (image sensor) equipped inside the imaging apparatus. This cover glass is disposed between the imaging device and a lens.

Figure 3:
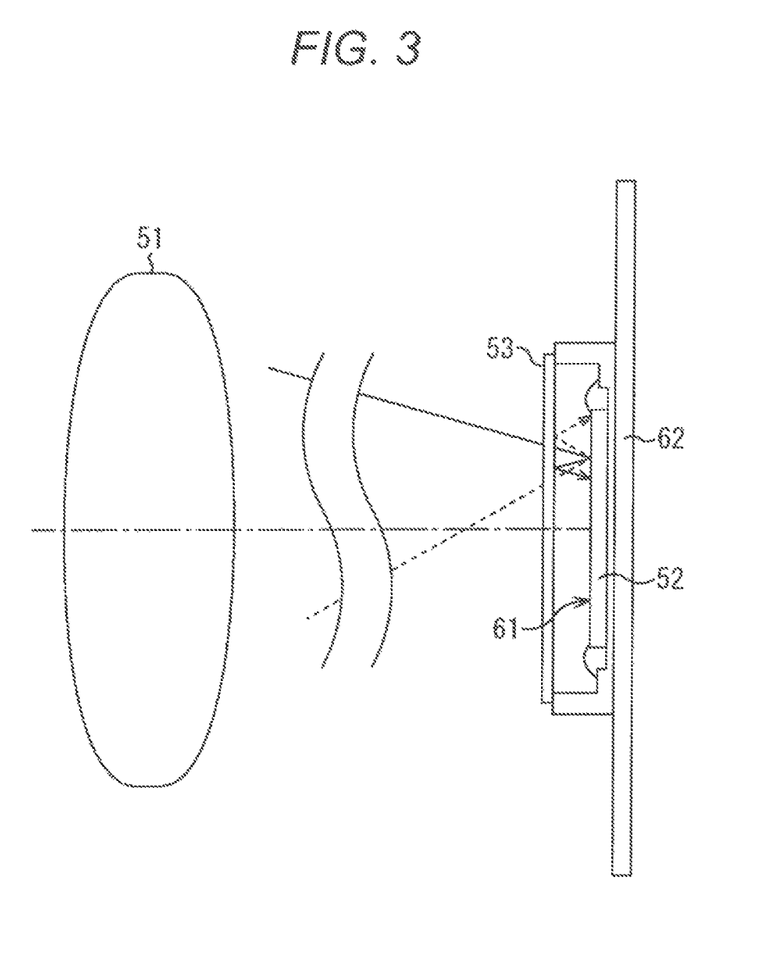
FIG. 3 is a view illustrating a configuration of a conventional imaging apparatus.

According to a conventional imaging apparatus illustrated in FIG. 3, for example, a cover glass 53 is provided for protecting a light receiving surface (surface) of an imaging device 52. The cover glass 53 is disposed between a lens 51 and an imaging device 52. The lens 51 condenses light received from a subject, while the imaging device 52 forms a pickup image by photoelectric conversion of light received from the subject.

According to this example, the imaging device 52 includes a light receiving unit 61 for receiving light from the lens 51, and a substrate 62 for supporting the light receiving unit 61. Respective imaging elements are disposed such that the surface, i.e., the light receiving surface of the light receiving unit 61 extends in parallel with the surface of the cover glass 53. Accordingly, the surface of the cover glass 53 extends in a direction substantially perpendicular to the normal line of the surface of the light receiving unit 61.

When light emitted from the subject and condensed by the lens 51 enters the light receiving unit 61 as indicated by a solid arrow and a dotted arrow in the figure, a part of the entering light is reflected on the surface of the light receiving unit 61 and released as stray light. This stray light is further reflected on the cover glass 53 and again enters the light receiving unit 61.

Accordingly, a part of the light emitted from the subject and entering the light receiving unit 61 diffuses as a result of diffusion reflection on the surface of the light receiving unit 61, and as a result of the further continuation of reflection between the surface of the light receiving unit 61 and the cover glass 53. When this diffused light is received by the light receiving unit 61, a flare (blur of bright image produced by high-luminance stray light) is generated in a pickup image formed by the imaging apparatus.

Figure 4:
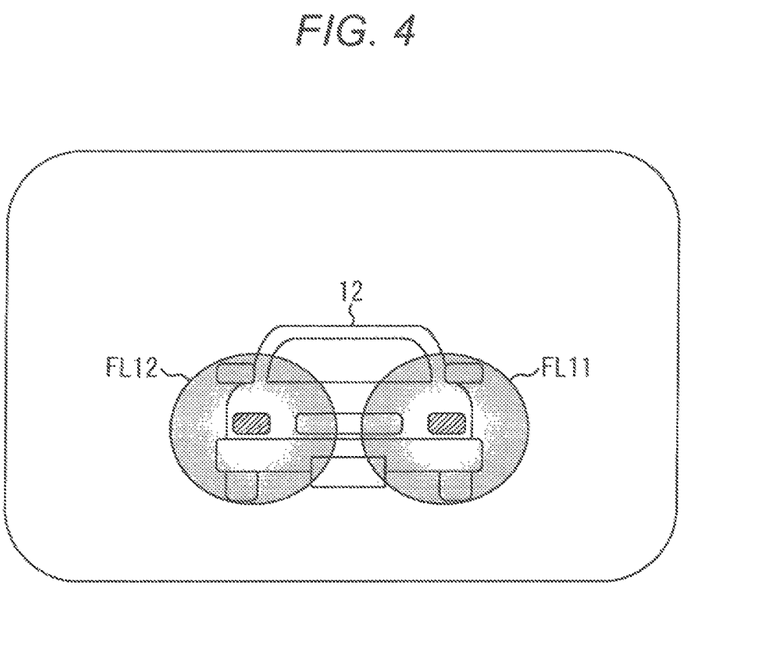
FIG. 4 is a view illustrating flares generated in a pickup image.

When the imaging apparatus provided on the vehicle forms an image of the front of the vehicle, for example, a pickup image illustrated in FIG. 4 is obtainable.

The pickup image of the example illustrated in FIG. 4 contains the vehicle 12 as a subject running in front of the vehicle on which the imaging apparatus is mounted. In this case, intense light emitted from each of high-beam headlamps of the vehicle 12 is reflected between the light receiving unit 61 and the cover glass 53 of the imaging apparatus. As a result, a flare FL11 and a flare FL12 are generated in the vicinity of the high-beam headlamps.

The flares FL11 and FL12 thus generated considerably deteriorate visibility of the pickup image illustrated in FIG. 4 at a portion corresponding to the vehicle 12 in the figure. According to this example, visibility of an area of contact between the vehicle 12 and a road (road surface) is lowered by the flares FL11 and FL12.

In general, one of important clues for recognizing a state of a target placed on the road surface is the position of contact between the target and the road surface. As can be understood from this example, the presence of the generated flares may prevent accurate identification of the position of contact of the vehicle 12, and further of an obstacle such as a person present on the road surface in front of the vehicle 12 with the road surface by obstruction of a high-luminance light caused by flares.

Accordingly, when the pickup image contains flares, the quality of the pickup image lowers. In this case, the position of contact with the road surface is difficult to determine based on the pickup image even while this position may become useful information for driving assistance.

According to the example illustrated in FIG. 4, for example, visibility of the portion of contact between the vehicle 12 and the road (road surface) is low. In this condition, an obstacle on the road surface, and further a white line of the road and the like used for driving assistance may be difficult to recognize.

Particularly, a portion in the lower half of the vehicle on the front and rear of the vehicle, i.e., an area in the vicinity of the portion of contact between the vehicle and the road surface is an important area for recognizing the presence of an obstacle or the like which may become a harmful object during running. Accordingly, the lower half area of the vehicle corresponds to an area in need of caution of the driver. For estimation of a distance between the imaging apparatus and a particular portion on a flat road surface, the imaging apparatus needs to obtain an accurate position of contact of the particular portion on the road surface, and therefore needs to recognize an accurate portion of contact between the road surface and the vehicle 12 or other possible obstacles such as a pedestrian and a motorcycle in front of the vehicle 12. Accordingly, useful information is difficult to obtain with high certainty when visibility of an image area containing a lot of information necessary for the driver, i.e., an area to notice is lowered by flares.

In addition, when the light emitted from each of the high-beam headlamps of the vehicle 12 is intense, for example, the contour of the vehicle 12 may become difficult to recognize due to the presence of the flares FL11 and FL12 in the pickup image. In this case, a person standing on the road surface at a position closer than the vehicle 12, or a contact portion between the road surface and a motorcycle or the like located closer than the vehicle 12 may become difficult to recognize.

According to the conventional imaging apparatus, therefore, flares generated when relatively intense light enters the imaging apparatus may damage information in the vicinity of the contact portion between the vehicle 12 and the road surface. In this case, information useful for vehicle driving such as estimation of distance and determination of the presence or absence of a pedestrian, a bicycle, a motorcycle or the like (not shown), and white line information, and information such as the wheel contour, and the position of contact between a target vehicle and the road surface for distance estimation of the target vehicle may be difficult to obtain with certainty.

<Configuration Example of Imaging Apparatus>

Figure 5:
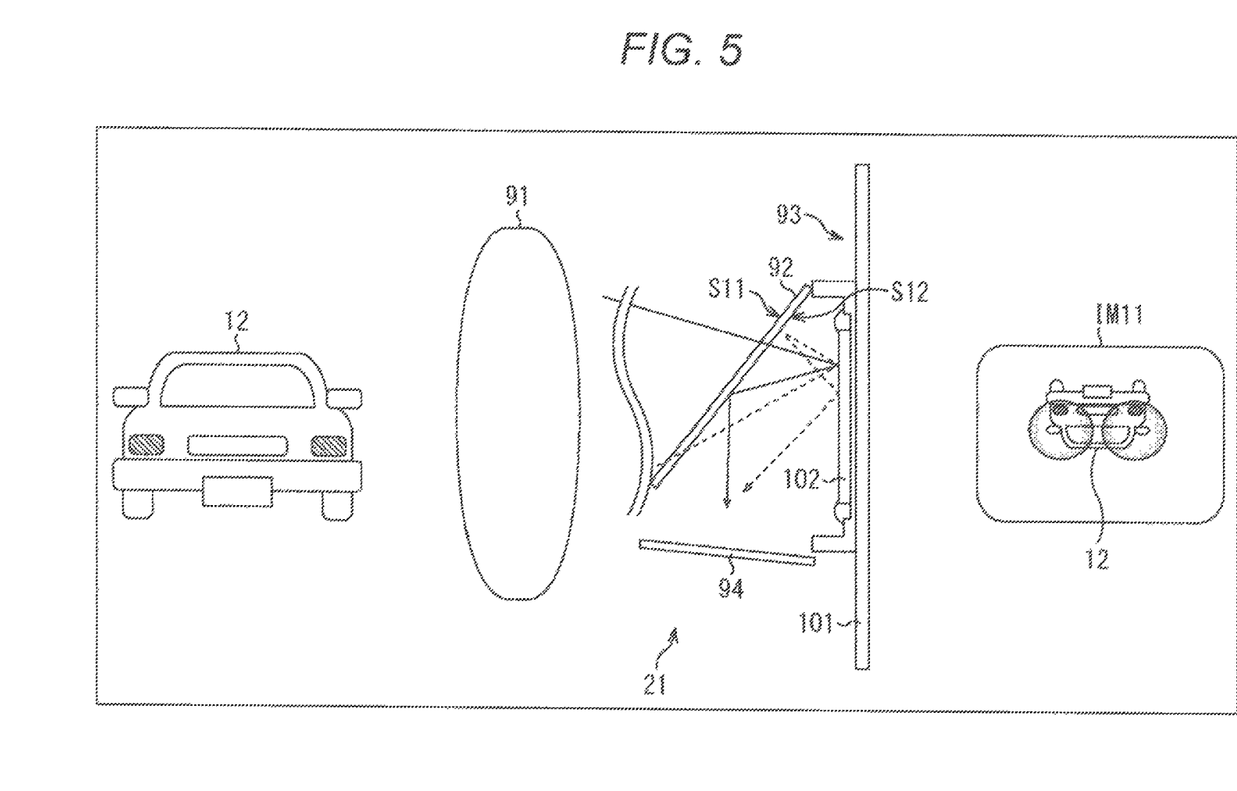
FIG. 5 is a view illustrating a configuration of an imaging apparatus to which the present technology has been applied.

According to the present technology, therefore, a cover glass is obliquely attached to an imaging device to reduce obstructive stray light produced by flare light and offer useful information with higher certainty based on a pickup image as illustrated in FIG. 5, for example.

FIG. 5 illustrates a more detailed configuration of the imaging apparatus 21, which is an on-vehicle camera or the like provided on the vehicle 11 illustrated in FIGS. 1 and 2. As illustrated in FIG. 5, the imaging apparatus 21 according to the present technology includes an optical system 91, a cover glass 92, an imaging device 93, and a stray light absorber 94.

FIG. 5 illustrates the vehicle 12, which corresponds to an example of a subject to be imaged, on the left side of the imaging apparatus 21. FIG. 5 further illustrates an image IM11 of the subject such as the vehicle 12 on the right side of the imaging apparatus 21.

The optical system 91 is an image forming system constituted by one or a plurality offenses and the like, and forms an image on the imaging device 93 in accordance with light received from the subject such as the vehicle 12.

The cover glass 92 is disposed between the optical system 91 and the imaging device 93. The cover glass 92 functions as a protection member for protecting the light receiving surface of the imaging device 93, and also functions as an optical filter such as a near-infrared light cut filter and a low pass filter.

A surface S11 and a surface S12 of the cover glass 92 are obliquely disposed such that a predetermined angle is formed by the imaging device 93 and the surfaces S11 and S12. An optical film may be formed at least on either the surface S11 or the surface S12 (film formation) by deposition or other methods to allow the cover glass 92 to function as an optical filter. The cover glass 92 may have a flat plate shape, for example, including the surface S11 of the cover glass 92 on the optical system 91 side and the surface S12 of the cover glass 92 on the imaging device 93 side, as surfaces extending in parallel with each other. A space between the cover glass 92 and a light receiving unit 102 in this figure is not illustrated as a sealed space.

The imaging device 93 is constituted by solid imaging elements such as CCD (charge coupled device) sensors, and forms a pickup image by photoelectric conversion of light received from the optical system 91 via the cover glass 92. More specifically, the imaging device 93 includes a substrate 101, and the light receiving unit 102 fixed to the substrate 101. The light receiving unit 102 is disposed such that an image is formed on a light receiving surface of the light receiving unit 102 in accordance with light received from the optical system 91.

Accordingly, when the vehicle 12 illustrated on the left side in the figure corresponds to a subject, light emitted from the vehicle 12 passes through the optical system 91 and the cover glass 92, and enters the surface of the light receiving unit 102. In this case, the light emitted from the vehicle 12 is condensed by the optical system 91, whereby the reversed projection image IM11 is formed on the surface of the light receiving unit 102 as illustrated in the right part of the figure. According to this example, the image IM11 of the vehicle 12 reversed in the up-down direction is formed as an image of the vehicle 12 corresponding to the subject.

The stray light absorber 94 is a sensor reflection stray light absorber disposed below the cover glass 92 in the figure to absorb light obliquely reflected on the imaging device 93 and the cover glass 92 as a part of light emitted from the subject and entering the imaging device 93 via the optical system 91. The stray light absorber 94 is disposed obliquely to an optical axis of the surface S12 of the cover glass 92.

Figure 6:
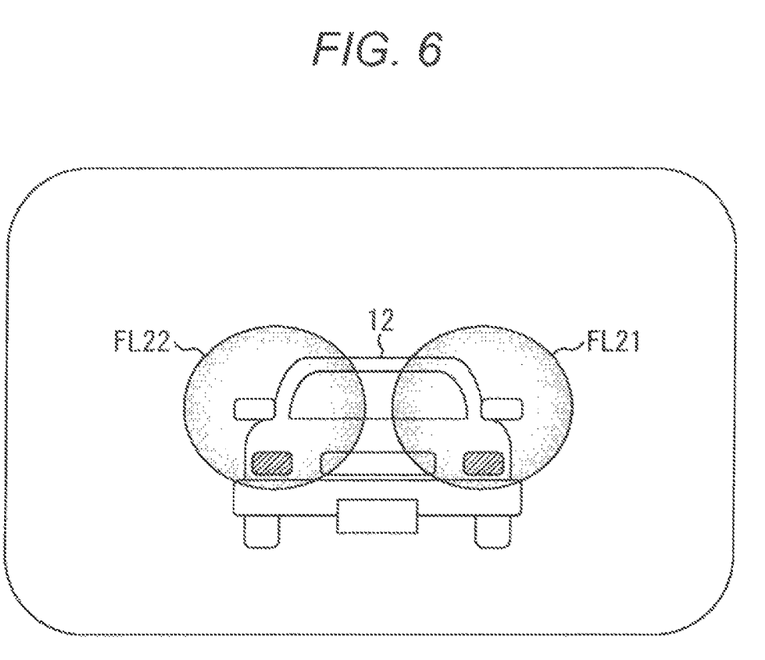
FIG. 6 is a view illustrating flares generated in a pickup image.

When the imaging apparatus 21 provided on the vehicle 11 forms an image of the front of the vehicle 11, a pickup image illustrated in FIG. 6 is obtainable, for example.

According to the example illustrated in FIG. 6, the pickup image contains, as a subject, the vehicle 12 running in front of the vehicle 11 on which the imaging apparatus 21 is mounted. Intense light is emitted from the high-beam headlamps of the vehicle 12, and reflected between the light receiving unit 102 and the cover glass 92. As a result, flares FL21 and flares FL22 are generated in the vicinity of the high-beam headlamps.

According to the imaging apparatus 21, however, the surface of the cover glass 92, particularly the light receiving unit 102 side surface S12 of the cover glass 92 is disposed not in parallel with the surface of the light receiving unit 102 for receiving light emitted from the subject (sensor surface), but disposed obliquely to this surface. In addition, the imaging apparatus 21 includes the stray light absorber 94 for absorbing stray light.

Accordingly, in the case of the example illustrated in FIG. 6, the flares FL21 and FL22 are shifted upward in the pickup image in the direction opposite to the direction toward the road surface, i.e., in the direction toward the sky in the pickup image. In this case, visibility of a portion of contact between the vehicle 12 and the road surface improves in comparison with the visibility in the example illustrated in FIG. 4. Accordingly, useful information about the vicinity of the road surface is extractable from the pickup image with higher certainty. Moreover, the intensities (light amounts) of the flares FL21 and FL22 are lower than the intensities of the flares generated in the example illustrated in FIG. 4. Accordingly, visibility around the vehicle 12 also improves.

More specifically, according to the imaging apparatus 21 illustrated in FIG. 5, the normal line of the surface S12 and the normal line of the surface of the light receiving unit 102 form an angle of substantially 45 degrees. In addition, the surface S12 is so fixed as to face downward, i.e., in the vertical direction in FIG. 5. The stray light absorber 94 is provided in the direction where the surface S12 faces.

When the normal line of the cover glass 92 is defined obliquely to the surface of the light receiving unit 102 and directed toward the road surface in an actual space as in this example, at least a part of high-luminance light entering from the optical system 91 into the light receiving unit 102 and reflected on the surface of the light receiving unit 102 (hereinafter abbreviated as stray light when appropriate) is reflected or absorbed so that this light does not again return to the vicinity of the subject on the light receiving unit 102, as indicated by solid and dotted arrows in FIG. 5.

For example, the surface S12 in FIG. 5 is obliquely disposed to face obliquely downward toward the right. In this case, even when high-luminance stray light reflected on the surface of the light receiving unit 102 is further reflected on the surface S12 and returns to the light receiving unit 102 as indicated by the dotted arrow, this stray light enters at a position shifted downward in FIG. 5. In other words, the light reflected on the light receiving unit 102 and returned to the surface S12 is again reflected on the surface S12 toward the road surface. The downward direction corresponding to the shift direction of the entrance position of the stray light in this context is a shift direction on the light receiving unit 102 away from an area of the light receiving unit 102 associated with an area to notice, such as an area of contact between the vehicle 12 and the road surface in the pickup image.

The obliqueness of the surface S12 directs the stray light returned to the light receiving unit 102 toward the outside of the frame of the pickup image, or at least shifts the stray light upward in the pickup image when complete removal of the stray light is difficult. More specifically, the image IM11 of the subject reversed in the up-down direction is formed on the surface of the light receiving unit 102 as illustrated in the right part of FIG. 5. In this case, the stray light shifts upward in the pickup image in FIG. 6 when the entrance position of the stray light shifts downward in FIG. 5.

Accordingly, the flares FL21 and FL22 shift upward in the pickup image in the example illustrated in FIG. 6 in comparison with the positions of the flares in the example illustrated in FIG. 4. When the surface S12 has an oblique angle sufficient for again reflecting the stray light entering from the light receiving unit 102 into the surface S12 such that the stray light can travel toward the road surface in the actual space, the stray light entering the surface S12 and again reflected on the surface S12 shifts toward the sky in the direction opposite to the direction toward the road surface on the surface of the light receiving unit 102 reversely projected in the up-down direction, i.e., in the pickup image.

It is particularly preferable that the oblique angle of the cover glass 92, i.e., the surface S12 with respect to the surface of the light receiving, unit 102 is set to substantially 45 degrees. In this case, most of stray light reflected on the cover glass 92 does not enter the light receiving unit 102. However, the surface S12 of the cover glass 92 is only required to have such an oblique angle at which the optical path of the light reflected on the light receiving unit 102 and entering the surface S12 and the optical path of the light again reflected on the surface S12 become asymmetric with respect to the normal line of the surface of the light receiving unit 102 when the light reflected on the light receiving unit 102 and entering the surface S12 is again reflected on the surface S12.

As described above, the probability of the presence of an obstacle or the like becomes higher in an area around the position of contact between the vehicle 12 and the road surface, wherefore the area in the lower half of the vehicle 12 corresponds to an area to notice for the driver. Visibility of the area to notice in the pickup image improves when the entrance position of stray light shifts on the light receiving unit 102 in such a direction that an image of the stray light moves away from the area of high interest for the driver.

In this case, an image having higher image quality is formed for the area of high interest where an obstacle is present in the pickup image, wherefore more useful information is obtainable with certainty. This advantage contributes to driving assistance for a driver driving a vehicle.

It is possible that the shift of the entrance position of stray light lowers the image quality of an area corresponding to a shift destination position of the stray light in the pickup image in comparison with the image quality of this area before the shift of the stray light. However, high image quality is not needed for an area of relatively low interest for the driver. Accordingly, this situation causes no problem in obtaining information for driving assistance.

The imaging apparatus 21 is disposed such that the surface S12 faces the stray light absorber 94. In other words, the surface S12 and the stray light absorber 94 are disposed such that stray light reflected on the surface S12 travels toward the stray light absorber 94. In this case, most of the stray light reflected on the cover glass 92 and traveling toward an area out of the area of the light receiving unit 102 is absorbed by the stray light absorber 94. This structure considerably decreases the amount of stray light reflected on the cover glass 92, further reflected on a housing or the like within the imaging apparatus 21, and returning to the light receiving unit 102.

According to the example illustrated in FIG. 6, the intensities of the flares FL21 and FL22 are lowered in comparison with the example illustrated in FIG. 4 based on oblique arrangement of the cover glass 92 with respect to the light receiving unit 102, and on disposing the stray light absorber 94. Accordingly, visibility of the subject in the pickup image increases.

When the cover glass 92 functions as an optical filter, such as an infrared cut filter, for blocking or reflecting light in a predetermined wavelength band, i.e., predetermined wavelength components, for example, more effective reduction of flares is achievable in an arrangement of an optical film provided on the surface S12 side, rather than an arrangement of an optical film provided on the surface S11 side.

For example, a part of stray light having entered from the light receiving unit 102 into the cover glass 92 is reflected on the surface S12 toward the light receiving unit 102, while a part of the remaining stray light passes through the surface S12 and enters the surface S11. The stray light having entered the surface S11 is reflected on the surface S11 toward the light receiving unit 102.

In the two surfaces S11 and S12 of the cover glass 92 as surfaces for reflecting stray light, the reflectance of the surface covered with the optical film becomes higher.

Accordingly, when the optical film is formed on the surface S11 of the cover glass 92, most of the stray light having entered the surface S11 is reflected on the surface S11. As a result, most of the stray light having entered from the light receiving unit 102 into the surface S12 is reflected on both the surfaces S12 and S11 toward the light receiving unit 102. On the other hand, when the optical film is formed on the surface S12, a part of the stray light having passed through the surface S12 further passes through the surface S11. Accordingly, the amount of the stray light reflected toward the light receiving unit 102 decreases in comparison with the arrangement of the optical film formed on the surface S11.

As described above, the cover glass 92 is obliquely fixed such that a predetermined angle is loaned by the cover glass 92 and the light receiving unit 102. In this case, flares generated by stray light decrease, and visibility of an area to notice improves. Accordingly, useful information is extractable from a pickup image formed by the imaging apparatus 21 with higher certainty.

According to the example described herein, flares are shifted upward (upward in the vertical direction) in the pickup image. However, the shift direction of the flares is not limited to the upward direction, but may be an arbitrary direction, such as the left-right direction in the pickup image.

The embodiment according to the present technology is not limited to the embodiment described herein, but may be modified in various ways without departing from the subject matter of the present technology.

The present technology may have the following configurations.

[1]
An imaging apparatus including:
an image forming system that condenses light received from a subject;
an imaging unit that receives the light condensed by the image forming system and photoelectrically converts the light; and
a protection member provided to protect the imaging unit, and disposed between the image forming system and the imaging unit such that an imaging unit side surface of the protection member is disposed obliquely to the imaging unit.

[2]
The imaging apparatus according to [1], wherein the imaging apparatus is an on-vehicle camera.

[3]
The imaging apparatus according to [1] or [2], wherein the imaging unit side surface of the protection member reflects the light reflected on the imaging unit and entering the protection member such that the light travels in a direction away from an area of the imaging unit associated with an area of interest in an image formed by the photoelectric conversion at the imaging unit.

[4]
The imaging apparatus according to [1] or [2], wherein the imaging unit side surface of the protection member has an oblique angle at which an optical path of the light reflected on the imaging unit and entering from the imaging unit into the protection member and an optical path of the light again reflected on the imaging unit become asymmetric with respect to a normal line of a light receiving surface of the imaging unit when the light reflected on the imaging unit and entering the protection member is again reflected on the imaging unit.

[5]
The imaging apparatus according to [2], wherein the imaging unit side surface of the protection member has an oblique angle at which the light reflected on the imaging unit and entering the protection member is again reflected on the imaging unit toward a road surface.

[6]
The imaging apparatus according to any one of [1] through [5], wherein the imaging unit side surface of the protection member is disposed such that an angle of substantially 45 degrees is formed by the imaging unit side surface of the protection member and the light receiving surface of the imaging unit.

[7]
The imaging apparatus according to any one of [1] through [6], further including an absorbing member provided to absorb the light and disposed in a direction where the imaging unit side surface of the protection member faces.

[8]
The imaging apparatus according to any one of [1] through [7], wherein the protection member functions as an optical filter that blocks or reflects a predetermined wavelength component of the light having entered the protection member from the subject.

REFERENCE SIGNS LIST

11 Vehicle
21-1 through 21-3, 21 Imaging apparatus
91 Optical system
92 Cover glass
93 Imaging device 94 Stray light absorber
102 Light receiving unit

The invention claimed is:

1. An imaging apparatus configured to be used on a vehicle, the imaging apparatus comprising:
   an image forming system configured to condense light received from an approaching vehicle that approaches the vehicle;
   an imaging unit configured to:
      receive the light condensed by the image forming system; and
      photoelectrically convert the light;
   a protection member configured to:
      protect the imaging unit; and
      optically transmit the light received from the approaching vehicle,
   wherein the protection member is between the image forming system and the imaging unit such that an imaging unit side surface of the protection member is at an oblique angle to a light receiving surface of the imaging unit, and
   wherein the light that passes through the protection member and reflects on the imaging unit towards the protection member is reflected back on the imaging unit towards a road surface; and
   an absorbing member in a second direction that the imaging unit side surface of the protection member faces,
   wherein the absorbing member is configured to absorb the light reflected back on the imaging unit towards the road surface.

2. The imaging apparatus according to claim 1, wherein the imaging apparatus is an on-vehicle camera.

3. The imaging apparatus according to claim 2, wherein the on-vehicle camera is configured to enable a driving assistance system including at least one of a collision alert or a warning of deviation from a lane.

4. The imaging apparatus according to claim 1,
   wherein the imaging unit side surface of the protection member is configured to reflect the light reflected on the imaging unit such that the light travels in a first direction away from an area of the imaging unit, and
   wherein the area of the imaging unit corresponds to an area of interest in an image formed by the photoelectric conversion at the imaging unit.

5. The imaging apparatus according to claim 4, wherein a field of view of the imaging unit includes at least one of frontward of the vehicle or rearward of the vehicle, and
   wherein the area of interest in the image includes a position of contact between the road surface on which the vehicle is in motion and the approaching vehicle.

6. The imaging apparatus according to claim 1,
   wherein at the oblique angle, a first optical path of the light reflected on the imaging unit and a second optical path of the light reflected back on the imaging unit is asymmetric with respect to a normal line of the light receiving surface of the imaging unit.

7. The imaging apparatus according to claim 1,
   wherein a field of view of the imaging unit includes at least one of frontward of the vehicle or rearward of the vehicle.

8. The imaging apparatus according to claim 1, wherein the imaging unit side surface of the protection member is at an angle of 45 degrees with respect to the light receiving surface of the imaging unit.

9. The imaging apparatus according to claim 1, wherein the protection member is an optical filter configured to block or reflect a wavelength component of the light that enters the protection member from the approaching vehicle.

* * * * *